Patented Oct. 18, 1927.

1,645,786

UNITED STATES PATENT OFFICE.

HARPER F. ZOLLER, OF DETROIT, MICHIGAN, ASSIGNOR TO ARCTIC DAIRY PRODUCTS COMPANY, OF DETROIT, MICHIGAN, A CORPORATION OF MICHIGAN.

FOOD COMPOUND.

No Drawing.   Application filed July 21, 1922.   Serial No. 576,631.

The invention relates to synthesized food products having the physical character and the general dietetic character of milk, and it has to do more particularly with that class of products in which, as heretofore produced, vegetable oils or other fats take the place of the butter fat of normal whole milk.

In the production of products of the class referred to, it has been customary to combine skimmed milk and a suitable quantity of vegetable fat, preferably coconut oil, evaporate the mixture to about the consistency of the evaporated whole milk of commerce, and then can and sterilize the product in the manner followed in producing evaporated milk for the market. With constituent materials of suitable quality, the product thus produced is palatable and wholesome and has the great economic merit that it makes possible the utilization of substantial volumes of skimmed milk which might otherwise go to waste and can be produced at a lower cost than evaporated whole milk. However, it is recognized that these products as heretofore produced are not in all respects the equivalent of normal whole milk and, in particular that their vitamine content is lacking in comparison with whole milk, butter fat or cream being rich in vitamine A.

Obviously it is highly desirable to overcome this deficiency of these milk and vegetable fat compounds if it can be done without unduly increasing the cost of the product, and this, indeed, constitutes the chief object of the present invention.

A further object of the invention is the production of a synthesized milk product which not only equals cow's milk in dietetic value but which surpasses normal cow's milk in its suitability for the diet of infants and also in its nutritional value in the diet of adults.

The ends aimed at are attained by suitably combining skimmed cow's milk, vegetable fat, such as coconut oil, palm oil or hydrogenated cotton oil, and egg yolk or, in some cases, egg yolk fat. For reasons which will be explained, I prefer to also combine an alkali phosphate with the foregoing constituents. For some purposes I may omit the vegetable fat, adding to the skimmed milk only the egg yolk and the alkali phosphate.

In order that the practice of the invention may be quite clearly understood I shall now describe in detail the method of procedure to produce the product in its preferred form. The apparatus necessary or desirable is such as is required in ordinary milk condensing plants in which the product is canned for the market. The proportions of the ingredients are variable but may suitably be as follows:

10,000 lbs. skimmed milk, titrating 0.13% or less of lactic acid.

260 lbs. refined coconut oil, titrating less than 0.05% free acid, calculated as oleic acid.

50 lbs. dry egg yolk, free from rancidity and putrefaction.

5 lbs. di-sodium hydrogen phosphate (carrying twelve molecules of water of crystallization).

To combine these constituents the coconut fat is placed in the hot well and heated to about 90° F. The egg yolk is then stirred into the melted oil until no lumps are visible. The moderate temperature of 90° F. is specified to avoid coagulation of the egg yolk at this stage. The temperature might be carried as high as 120° F. without causing such coagulation, but nothing is to be gained by the higher temperature and it is better to keep it below 100° F. Next, the skimmed milk is run into the oil and egg yolk mixture, meanwhile stirring. Then the sodium phosphate is dissolved in about two gallons of hot water and the solution added to the milk menstruum.

The liquid mixture is now heated with live steam to a temperature of 185°–200° F. for twenty minutes, after which it is drawn into the vacuum pan and evaporated at 130°–140° F. to a standard of 6% fat and 24% total solids. The evaporated product is now emulsified by running it through an homogenizer or viscolizer and subsequently cooled, as by passing over a brine cooler, to 35°–40° F. at which temperature it is held for canning and sterilization.

In sterilizing the canned product the usual procedure in sterilizing evaporated milk is followed. For one pound cans the product is held for twenty minutes at a temperature of 242° F.

The effect of preheating the mix at a temperature of 185°–200° F. before evaporating is twofold. One effect is the raising of the curdling temperature of the milk so that it can subsequently be sterilized at a higher temperature. The second desired effect is the coagulation of the egg yolk before the mix enters the vacuum pan. If this is not accomplished the egg yolk may stick to the coils of the vacuum pan and burn on.

The sodium phosphate is added to the mixture as above described to compensate for the relatively large amount of calcium salts present in the egg yolk, and to further condition the salt equilibrium of the mixture so that the product after evaporation can withstand the sterilization conditions without curdling in the cans. Any of the alkali phosphates, e. g., potassium phosphate or ammonium phosphate, can be used in lieu of sodium phosphate, but I prefer the latter on account of its lower cost.

The composition given above can be varied widely according to the character of the product desired. For example, a fat content ranging anywhere from 6% to 9% for the condensed product may be found satisfactory and a still wider variation is feasible if desired. Again the percentage of egg yolk can be varied widely according to the composition desired for the product. However, the skimmed milk solids should not be increased greatly above the proportion specified because of the difficulty in processing that is likely to result. The proportion of phosphate used will vary somewhat with different batches of milk in order to secure the results mentioned above, in fact, where milk from cows on dry feed is used the phosphate can be reduced practically to zero.

My improved product is quite as palatable as the best evaporated milk and in addition it has very remarkable dietetic qualities by reason of the food values that are added in the egg yolk to the food values of the skimmed milk and the vegetable fat. The food values of both skimmed milk and of the vegetable fats, such as coconut oil, are well understood and are extensively utilized. Eggs, also, are one of the basic foods and their food value is in a general way well appreciated but the peculiar food values of egg yolk, as distinguished from the white of the egg, are not commonly understood. These food values of egg yolk have been well established by the work of scientific investigators but, as stated, they are not yet generally appreciated. One of the notable characteristics of egg yolk is its large vitamine content, vitamines A and B both being present in it. A careful compilation of the latest available data of both British and American investigators shows that the fat content of egg yolk is as rich in vitamine A as is butter fat and cod liver oil and that it is rich also in vitamine B. Thus by the introduction of the fat of egg yolk into my improved synthesized milk I entirely overcome the lack of vitamine content which is characteristic of prior so-called compound milks.

But egg yolk, in addition to its high vitamine content, has a very remarkable content of organic iron. Indeed, the percentage of organic iron contained in egg yolk is greater than in any other known food material. The organic form of the iron is of vital importance because it is only in this form that it can be assimilated. Indeed, organic iron is believed to be an antecedent of hæmoglobin contained in the red cells of the blood. Cases of mal-nutrition which are characterized by a depletion of the hæmoglobin can only be cured by the administration of organic iron in food in which it is in an organic combination resembling the hæmoglobin iron complex. Thus it will be seen that the high organic iron content of egg yolk makes it an extremely valuable food.

Egg yolk, furthermore, has a high phosphorus content as compared with the albumin of the egg and as compared also with milk. The phosphorus content of milk is largely in the form of inorganic phosphates such as calcium and potassium salts, about 60% of the total being in this form. The remainder exists as the phospho-protein, casein. The phosphorus content of egg yolk is more than five times that of milk and about one-half of it is in the form of the phospho-protein, ovavitellin, while about three-fourths of the remainder is in the form of phosphorized fats such as lecithin and phospholipines. It is believed that phosphorized fats are essential to infant growth and they are certainly important in the diet of the adult for waste repair. Ovavitellin phosphorus is equally as important in the dietary as casein phosphorus.

Finally, it is to be observed that the composite ash of egg yolk is acid forming, in this respect being similar to all meats, while the ash of milk is base forming. Thus the combination of egg yolk with milk gives a desirable balance in this respect.

Egg yolk possesses other valuable characteristics as a concentrated food but its chief characteristics, already mentioned, sufficiently indicate the marked advantages flowing from the inclusion of egg yolk in a synthetic milk product of the character in question. Not only are all the known food values of whole cow's milk secured, including the vitamines, but also the product has in substantial measures additional food substances and characteristics which are essential to normal human metabolism of both infant and adult. Furthermore, the product has the homogeneous form of a permanent emulsion like evaporated milk, is palatable and is capable of production at a cost materially less than the cost of evaporated whole milk.

As was previously stated, it may be desirable in some cases to use the fat of the egg yolk rather than the entire yolk. While the egg yolk fat does not, of course, carry all the food values of the yolk, it does contain the vitally important vitamines and the phosphorized fats which have been referred to. The egg yolk fat can be prepared by extraction with carbon tetra-chloride in any suitable commercial extraction apparatus. The extracted fat, after separation from the yolk residue, is subjected to distillation to recover the carbon tetra-chloride. The fat is then stored in tins sealed from the air and held pending use at low temperatures ranging from zero to 20° F. The yolk residue in the form of powder can be used in the baking industry.

In the preparation of my synthetic milk product with yolk fat rather than the entire yolk the procedure is substantially the same as above described, the relative amounts of the vegetable fat and the yolk fat being determined by the character of product desired. The alkali phosphate, however, can be decreased in amount.

If the condensed milk product is to be prepared, as above mentioned, without the inclusion of vegetable fat, the procedure is like that first described except that a suitable small portion of the skimmed milk is heated to 90°–100° F. and the egg yolk is stirred into it until a smooth mixture is secured. The main portion of the skimmed milk is then added and the procedure carried forward as described in the first instance. The relative amount of egg yolk used can be varied widely but a composition giving a condensed product of desirable qualities is 24% total solids and 2% egg yolk, or thereabout. Such a product contains less fat than that first described but it has all of the other desirable characteristics of the first described composition. If the vitamine enrichment of the skimmed milk is the chief desideratum, it is entirely feasible to combine with the skimmed milk a suitable amount of the extracted egg yolk fat alone, thereafter evaporating the mixture to the desired concentration. It will be noted that an outstanding characteristic of all forms of composition that have been mentioned is the introduction of vitamines through the medium of egg yolk fat.

It is to be understood that while I have described preferred compositions for the product and a preferred method of procedure, there can be variation of the specific compositions and procedure described without departing from the invention, the scope of the invention being indicated by the following claims.

What I claim is:

1. A synthetic food product in the form of an emulsified liquid mixture containing the non-fatty solids of milk, and additional solids comprising vegetable fat and the fat of egg yolk.

2. A synthetic food product in the form of an emulsified liquid mixture containing the non-fatty solids of milk, vegetable fat, and the solids of egg yolk.

3. A synthetic food product comprising in combination an emulsified liquid mixture of vegetable fat, egg yolk and the solids of skimmed milk, having a fat content of approximately 6% and a total solids content of approximately 24%.

4. A synthetic food product comprising in combination a sterilized emulsified liquid mixture of the solids of skimmed milk, vegetable fat, egg yolk and sodium phosphate.

5. The process of making a synthetic food product which comprises heating coconut oil to a temperature not exceeding 100° F., intimately mixing egg yolk with said heated oil, adding skimmed milk to said mixture, heating the resulting product to a temperature of 185°–200° F. and holding it at such temperature for several minutes, evaporating the product to remove a portion of its moisture, and emulsifying the concentrated product.

6. The process of making a synthetic food product comprising introducing egg yolk into a liquid menstruum heated to a temperature not exceeding 100° F., intimately mixing the yolk and menstruum, adding skimmed milk to said mixture, heating the resulting product to a temperature of 185°–200° F. and holding it at said temperature for several minutes, evaporating the product to remove a portion of its moisture, and emulsifying the concentrated product.

7. The process of making a synthetic food product which comprises intimately mixing egg yolk with a liquid menstruum, adding skimmed milk to said mixture, heating the resulting product to a temperature of 185°–200° F. and holding it at such temperature for several minutes, evaporating the product to remove a portion of its moisture and emulsifying the concentrated product.

8. The process of making a synthetic food product which comprises intimately mixing vegetable fat, egg yolk, skimmed milk and sodium phospate, evaporating the resulting mixture to remove a portion of its moisture, emulsifying the concentrated product, and finally subjecting said product to a sterilizing heat treatment in hermetically sealed containers.

9. The process of making a synthetic food product which comprises heating coconut oil to a temperature not exceeding 100° F., intimately mixing egg yolk with said heated oil, adding skimmed milk to said mixture, heating the resulting product to a temperature upward of 165° F. and holding it at such temperature for several minutes, evaporating the product to remove a portion of its moisture, emulsifying the concentrated product, and subjecting the product to sterilizing heat treatment in hermetically sealed containers.

In testimony whereof, I hereunto affix my signature.

HARPER F. ZOLLER.